(12) United States Patent
Yan et al.

(10) Patent No.: US 7,933,798 B1
(45) Date of Patent: Apr. 26, 2011

(54) DETERMINING AND DISPLAYING IMPRESSION SHARE TO ADVERTISERS

(75) Inventors: Weipeng Yan, Redwood City, CA (US); Shivakumar Venkataraman, Santa Clara, CA (US); Anshul Kothari, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 430 days.

(21) Appl. No.: 12/127,731

(22) Filed: May 27, 2008

Related U.S. Application Data

(60) Provisional application No. 60/940,361, filed on May 25, 2007.

(51) Int. Cl.
*G06Q 40/00* (2006.01)
(52) U.S. Cl. .............................. 705/14; 705/30
(58) Field of Classification Search ............... 705/10–44
See application file for complete search history.

(56) References Cited

U.S. PATENT DOCUMENTS

| | | | | |
|---|---|---|---|---|
| 5,855,006 A | * | 12/1998 | Huemoeller et al. | 705/9 |
| 6,285,991 B1 | * | 9/2001 | Powar | 705/76 |
| 6,763,334 B1 | * | 7/2004 | Matsumoto et al. | 705/14.19 |
| 6,973,436 B1 | * | 12/2005 | Shkedi | 705/14.44 |
| 7,050,986 B1 | * | 5/2006 | Vance et al. | 705/5 |
| 7,100,111 B2 | * | 8/2006 | McElfresh et al. | 715/207 |
| 7,599,853 B2 | * | 10/2009 | Matsumoto et al. | 705/14.26 |
| 7,693,652 B2 | * | 4/2010 | Cheung | 701/200 |
| 7,835,939 B1 | * | 11/2010 | Karlsson | 705/10 |

OTHER PUBLICATIONS

Nelson Wang, "Auctioning of Ad Space Gets Boots With Successful Launch of Site": Mar. 2, 1999.*
Morrissey, Brian, "Beefing up bann ads: how data-fueled ad exchanges could significantly boost the power of targeted online display advertising", Dialog file 570, Accession No. 02687575, Brandweek, v51, n7, p. 10(2), Feb. 15, 2010.*

* cited by examiner

*Primary Examiner* — Frantzy Poinvil
(74) *Attorney, Agent, or Firm* — Fish & Richardson P.C.

(57) ABSTRACT

An advertisement associated with a bid and a budget for placement of the advertisement is received, and a determination as to whether to present the advertisement is made. A number of times the advertisement is presented is calculated, and the number of times the advertisement is not presented is calculated. An impression share statistic for the advertisement is calculated based on the calculation of the number of times the advertisement is presented and the calculation of the number of times the advertisement is not presented.

25 Claims, 5 Drawing Sheets

DETERMINING AND DISPLAYING IMPRESSION SHARE TO ADVERTISERS

CROSS-REFERENCE TO RELATED APPLICATION

This application claims priority to U.S. Provisional Patent Application Ser. No. 60/940,361 filed May 25, 2007, and entitled "Determining and Displaying Impression Share to Advertisers in an Advertising Network," the contents of which are incorporated herein by reference.

TECHNICAL FIELD

The subject matter of this application is generally related to online advertising, and more particular relates to systems and methods for measuring the relative share of impressions an advertisement receives.

BACKGROUND

Interactive media (e.g., the Internet) has great potential for improving the targeting of advertisements ("ads") to receptive audiences. For example, some websites provide information search functionality that is based on keywords entered by the user seeking information. This user query can be an indicator of the type of information of interest to the user. By comparing the user query to a list of keywords specified by an advertiser, it is possible to provide targeted ads to the user. An example of such a system is AdWords™ offered by Google, Inc. (Mountain View, Calif.).

Another form of online advertising is ad syndication, which allows advertisers to extend their marketing reach by distributing contextual ads to additional partners. For example, third party online publishers can place an advertiser's text or image ads on web properties with desirable content to drive online customers to the advertiser's website. An example of such a system is AdSense™ offered by Google Inc.

In contextual advertising systems (e.g., AdSense™), ads are selected and served by automated systems based on the content displayed by the user in, for example, a browser window. The displayed content is analyzed to determine the "context" of the page (e.g., the main topic), so that ads that best match the context can be targeted to the web page. In contextual advertising systems such as AdSense, once the context of a content page is matched to a set of potential advertisements for display, an auction mechanism is used to select one or more potential advertisements to actually appear on the page. In this manner, a small subset of advertisements that can potentially appear on any particular relevant content page actually do appear on each web page.

When a member of the advertising audience (hereinafter referred to as a "viewer" or "user" without loss of generality) views one of the ads (such as when a page of content including the ad is displayed and/or rendered to the audience member), that is deemed to be an "impression" of the ad. The reasons the advertisements are not displayed are not typically presented to the advertiser associated with the advertisements, therefore, advertisers do not know how to improve their ads.

SUMMARY

This document describes systems and methods for providing advertisers in an advertising network with a display and information derived from impression share metrics. Impression share metrics are provided to an advertiser that represent the percentage of times an ad or set of ads were presented or rendered on a content page (i.e., accrued impressions) out of a total number of potential page impressions where the ad or set of ads could have appeared, been presented or been rendered (i.e., total potential impressions). Preferably, total potential impressions include accrued impressions, impressions lost from an advertiser budget limits (i.e. throttled impressions), and impressions lost from losing bids for advertising slots in an advertising auction (i.e., lost impressions). From this impression share data, advertisers can be provided with derived information about their advertisement budgets (i.e., lost budget) and their advertisement rank (i.e., lost rank) that can assist an advertiser in maximizing their return on advertising investment based on novel and meaningful derivation of impression share data from large volumes of data in a manner not previously available to advertisers. The total potential impressions can be determined based on content matching advertising keywords (i.e., via either an "exact match" or a "broad match"), vertically defined content subject matter areas (i.e., verticals), or broadly defined content page form types (i.e., form and content classifiers).

In some implementations, a computer-implemented method provided, comprising receiving an advertisement associated with a bid and a budget for placement of the advertisement, determining whether to present the advertisement, calculating a number of times the advertisement is presented, calculating the number of times the advertisement is not presented, and calculating an impression share statistic for the advertisement based on the calculation of the number of times the advertisement is presented and the calculation of the number of times the advertisement is not presented. Other embodiments of this aspect include corresponding systems, apparatus, and computer program products.

In some implementations, a computer-implemented method further comprises determining whether the budget associated with the advertisement has been exceeded, and presenting the advertisement if the budget has not been exceeded. Other embodiments of this aspect include corresponding systems, apparatus, and computer program products.

In some implementations, a computer-implemented method further comprises determining whether the bid associated with the advertisement is higher than bids associated with other advertisements, and presenting the advertisement if the bid is higher than the bids associated with the other advertisements. Other embodiments of this aspect include corresponding systems, apparatus, and computer program products.

DETAILED DESCRIPTION

Advertising System Overview

Figure 1:
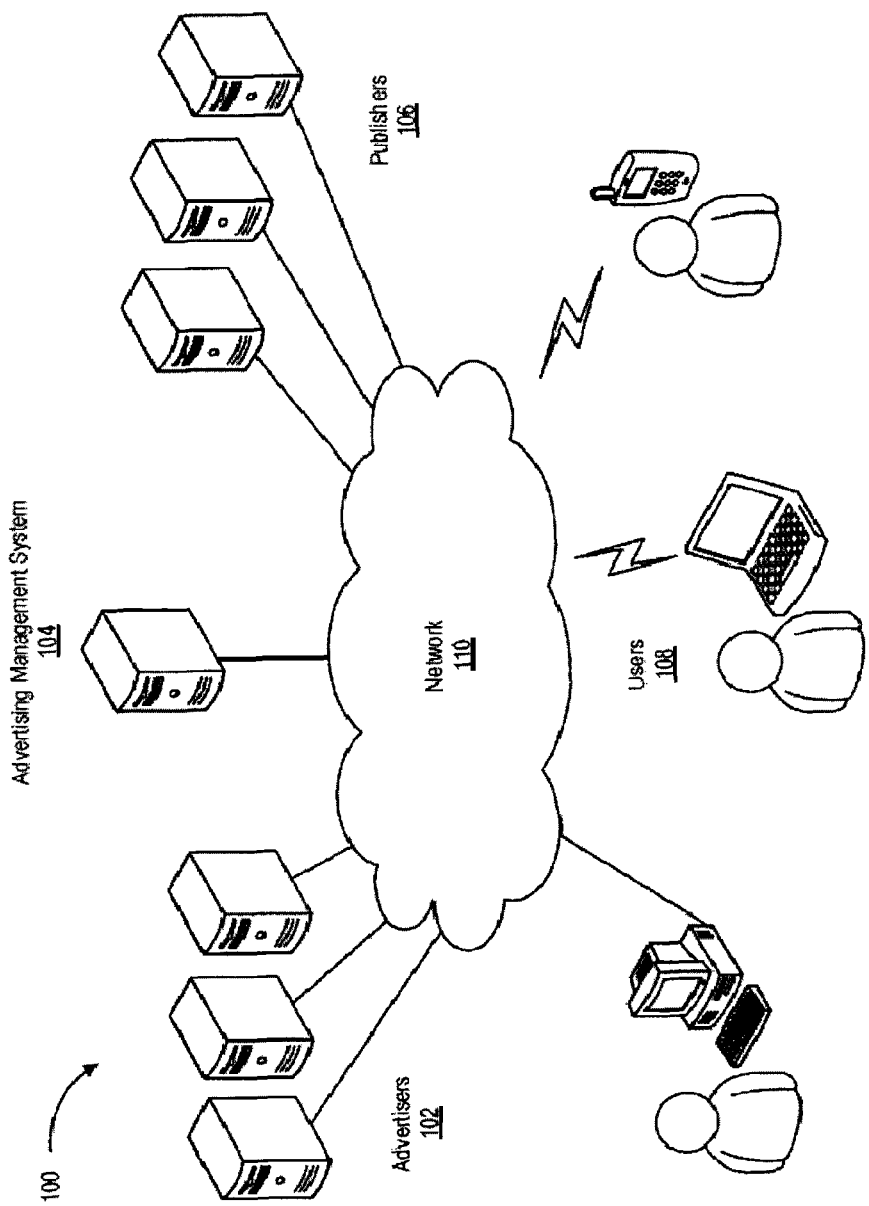
FIG. 1 is a block diagram of an implementation of an online advertising system.

FIG. 1 is a block diagram of an implementation of an online advertising system 100. In some implementations, one or more advertisers 102 can enter, maintain, and track advertisement ("ad") information in an advertising management system 104. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system 104. The system 104 responds by sending ads to the requesting publisher 106 for placement on one or more of the publisher's web properties (e.g., websites and other network-distributed content).

Users 108 and advertisers 102 can provide usage information to the system 104, such as, for example, whether or not a conversion or click-through related to an ad has occurred. This usage information can include measured or observed user behavior related to ads that have been served. In some implementations, the system 104 performs financial transactions, such as crediting publishers 106 and charging advertisers 102 based on the usage information.

A computer network 110, such as a local area network (LAN), wide area network (WAN), the Internet, intranet, wireless network, peer-to-peer network, or a combination thereof, connects advertisers 102, publishers 106 and users 108 to the system 104.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In particular, an advertiser can specify one or more content categories or content keywords that the advertiser wishes to associate with one or more submitted advertisements. In this manner, the advertiser's one or more ads can be placed into auctions for advertising spots on content that matches the content category or content keyword. Some examples of classifiers that can be used for classifying text in contextual ad targeting systems are described in U.S. patent application Ser. No. 10/676,571, for "Method and Apparatus for Characterizing Documents Based on Clusters of Related Words," filed Sep. 30, 2003. Another method for associating advertisements and advertising campaigns with market verticals is provided in U.S. patent application Ser. No. 11/112,732, entitled "Suggesting targeting information for ads, such as Websites and/or categories of Websites for example," filed Apr. 22, 2005. Each of these patent applications is incorporated by reference herein in its entirety.

In some implementations, the content server can combine the requested content with one or more of the ads provided by the system 104 by matching the ads to the content in the selected category. This combined content and ads can be sent to the user 108 that requested the content for presentation in a viewer (e.g., a browser or other content display system). The content server can transmit information about the ads back to the ad server, including information describing how, when, and/or where the ads are to be rendered (e.g., in HTML or JavaScript™)

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia, and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of search results.

The search service can submit a request for ads to the system 104. The request may include a number of ads desired. This number may depend on the search results, the amount of screen or page space occupied by the search results, the size and shape of the ads, etc. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc. The search service can combine the search results with one or more of the ads provided by the system 104. This combined information can then be forwarded to the user 108 that requested the content.

The advertisers 102 and user devices 108 can also provide usage information to the advertising management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of clicks on the content item, e.g., a link to a landing page, an advertisement, or a search result, by the number of times the content item was delivered. For example, if a link to a content item is delivered 100 times, and the content item was clicked on 3 times, then the CTR for that content item is 3%. Other usage information and/or performance metrics can also be used.

A "conversion" occurs, for example, when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Web page, viewing at least a certain number of Web pages, spending at least a predetermined amount of time on a Web page or Web pages, registering on a Web page, etc. Other actions that constitute a conversion can also be used.

In addition to the advertisements being selected based on content such as a search query or web page content of a publisher, the advertisements can also be selected from an auction. In one implementation, the advertisement management system 104 includes an auction process. Advertisers 102 may be permitted to select, or bid, an amount the advertisers are willing to pay for each presentation, interaction or other action (e.g., click of an advertisement) associated with the presentation of an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The rank of an advertisement that is displayed can be determined by, for example, multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0×$0.50=1.50

B: Rank=quality score×maximum cost-per-click=1.0×$0.75=0.75

C: Rank=quality score×maximum cost-per-click=1.0×$1.00=1.00

The advertisers can be ranked as follows:
1. A
2. C
3. B

An advertisement can also be associated with an actual cost-per-click. The actual cost-per-click of the advertisement can be determined by, for example, the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisers A, B, and C can be determined as follows:

A: C's rank/A's quality score=1.0/3=$0.33+$0.01=$0.34

C: B's rank/C's quality score=0.75/1=$0.75+$0.01=$0.76

B: minimum cost-per-click=$0.20

In this example, advertiser A would only have to pay $0.34 to hold the first position in the list of advertisements. C would have to pay $0.76 to hold the second position. Advertiser B would be required to pay the minimum cost-per-click amount of $0.20.

The advertisements, associated usage data, and bidding parameters described above can be stored as advertisement data in an advertisement data store 114. An advertiser 102 can further manage the serving of advertisements by specifying an advertising campaign. The advertising campaign can be stored in campaign data in an advertisement data store 114, which can, for example, specify advertising budgets for advertisements, when, where and under what conditions particular advertisements may be served for presentation, etc.

Advertisement Impression Share

Figure 2:
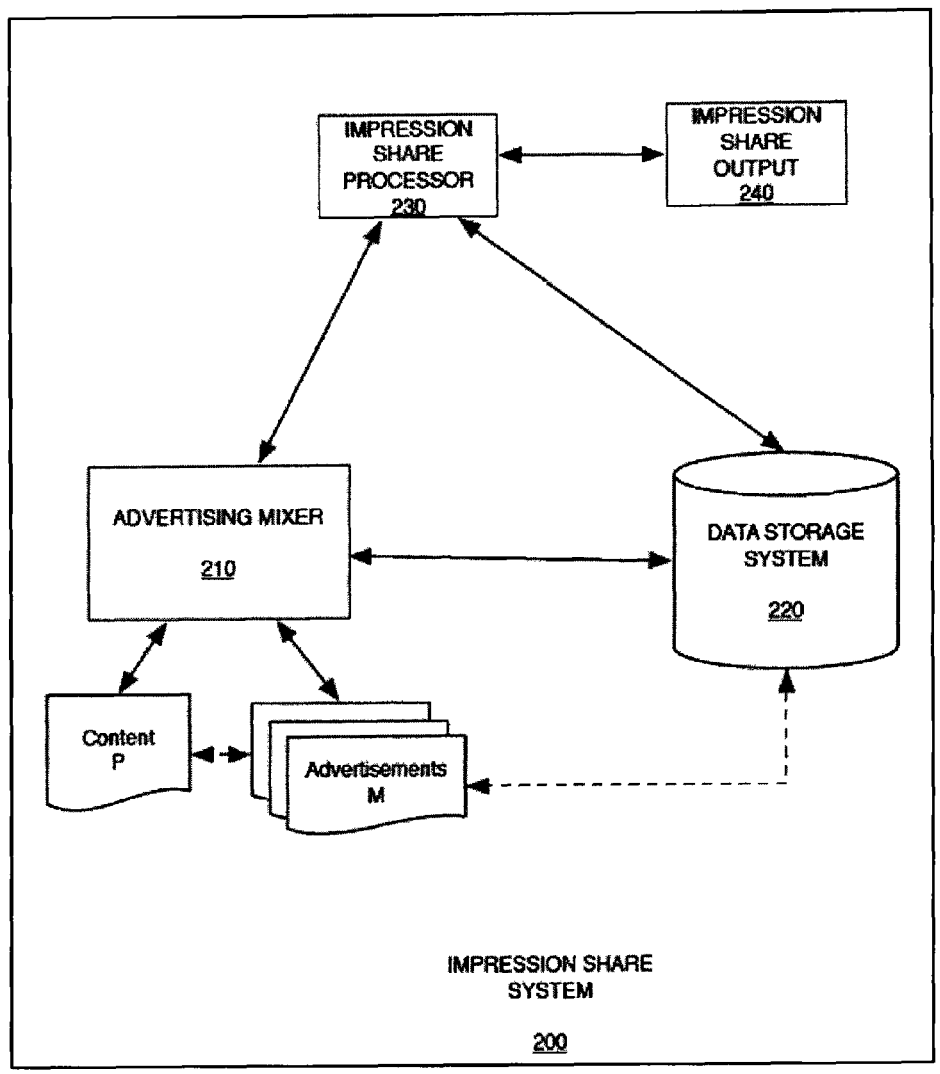
FIG. 2 is a block diagram of an implementation of a system for determining impression share.

FIG. 2 is a block diagram of an implementation of an advertising impression share system 200 for implementing and providing an advertisement impression share to an advertiser. The impression share system includes an advertising mixer 210 for combining advertisements for display, a data storage system 220 for storing advertising data logs, an impression share processor 230 for determining impression share statistics from data logs, and an impression share output 240 for providing impression share statistics to an advertiser. The impression share system 200 can be readily embedded in the advertising system 100, such that the data store for impression share, the impression share processor 230 and other components can be part of the system described in FIGS. 1 and 4.

In action, a publisher affiliated with the advertising system offers X advertising slots in a page of content P, such as, for example, a web page, provided to users by the publisher. The advertising system associates the page of content with a content category C. A number of advertisements N participate in the advertising system, each with a particular budget for each advertisement or a campaign of advertisements set by the respective advertiser, and bidding in auctions for placement of advertisements on content pages. A subset of these advertisers M, selected, for example, based on an association between the advertiser's field of interest and the content category C, participate in an auction for the X advertising slots on the publisher's content page P. Of the subset of participating advertisements M, some number of advertisements W win the auction to fill the X advertising slots, and the page of content P is delivered and rendered to the user including the W advertisements. The participating advertisements that do not win the auction L is typically equal to M−W. The losing advertisements L include principally those that had low bids Lb, those that ran out of advertising budget for the auction La. In some embodiments, some advertisements may be excluded from winning the auction for other reasons Lo. Generally, L=La+Lb, or in some embodiments L=La+Lb+Lo.

While the number of winning advertisements W is preferably equal to the number of ad slots X, they need not be the same number in all embodiments. Also, La and Lb are assumed to be non-overlapping, as an advertisement will typically lose the auction due to either low bids or low budgets. Alternatively, overlap between low bids Lb and low budgets La can be computed.

In the above example, for each of the W winning advertisements, the successfully rendered page of content P is considered an "accrued impression" Ia that is associated with those winning advertisements W.

For each of the losing advertisements Lb that lost due to a low bid, the lost auction is considered a "lost impression" Il that is associated with those losing advertisements Lb. For those losing advertisements La that lost due to budget limits, the lost auction is considered a "throttled impression" It that is associated with the losing advertisements La. In one embodiment, to speed results, overlapping throttled impressions and lost impressions can be filtered out. This speeds up results while having a minimal impact on the resulting data sets.

The advertising auction process is repeated one or more times for each of the publisher content pages P in the content category C, and the accrued impressions Ia, lost impressions Il, and throttled impressions It are accumulated for each advertisement that participates in the auction process for the content pages P in the content category C. When an advertisement participates in another content category C', then another set of accrued impressions Iac', lost impressions Ilc', and throttled impressions Itc' are computed for the additional content category C'. In this manner, for a particular advertisement, the advertisement's impression share in each particular content category of publisher pages can be calculated per advertisement or per advertising campaign for a particular advertiser.

When an advertiser submits an advertisement in a manner that targets a particular content, web site, or content category (i.e. site targeting), then the category of the targeted site is used for impression share determinations. Estimations of click through rate and estimations or extrapolations of the advertiser's activity over the content category may be used to normalize a site targeted campaign relative to standard auction advertising campaigns in terms of impression share.

Preferably, impression share is shown for an advertisement when the impressions recorded (some combination of Ia, Il and/or It) for an advertisement are at more than a predetermined meaningful threshold, such as, for example, 10% for a particular advertisement or campaign.

Impression share data is, in one embodiment, stored in the advertising server in a manner that permits computation of aggregated impression shares for an advertiser on a per-advertisement, per-advertising campaign, per advertising account, and per advertising customer level. Tracking of impressions on a per campaign, per advertising account and per advertising customer level can be readily performed by associating a unique ad campaign identifier, ad account identifier, and/or ad customer identifier with the impression data to be stored. Alternatively, the data can be provided only for individual advertisements or advertising campaigns. In particular, data structures used to store advertisement information within the advertising server can be extended to include the values Ia, Il and It as well as other existing advertiser and advertisement data. In one embodiment, the impression statistics are recorded hourly, and impression share is calculated in a periodic manner approximately once a day or once every half day. In other embodiments, the impression share is calculated in near-real time via continuous data updates.

One example data structure for storing information pertaining to impression share is provided in Table 1:

TABLE 1

| Data Type | Description (preferred data type) |
|---|---|
| Date and Time | Day and hour associated with the relevant impression event (Date, Int) |
| Ad Network/Ad Statistics Type | The ad network and related ad statistics used by the advertiser |
| Campaign | The advertising campaign ID to which the advertisement is related (bigint) |
| Account and Customer | The advertising account and/or advertising customer to which the advertisement is related (bigint) |
| Accrued Impressions | The accrued impressions for the advertisement from winning bids and/or appearance in content (int32) |
| Spam Impressions | Those impressions that should not be counted towards impression share due to spam content (int32) |
| Missed Impressions | Lost impressions + Throttled impressions (int32) |
| Lost Impressions | Impressions lost due to losing bids (int32) |
| Throttled Impressions | Impressions lost due to budget limitations (int32) |

In some embodiments, for example when there are a large number of advertisements in a particular set of auctions, the lost impressions value Il can be limited by only considering an advertisement to have lost an auction for low bidding, resulting in a lost impression Il being accrued, when the losing bid is above a percentage minimum threshold (such as, for example, 10%, 25% or 40% depending on the popularity of the auction, relative to the last winning bid for that auction.) Similarly, for ads with potentially throttled impressions (It), a similar threshold can be used, or, alternatively, an aggregated impression score can be calculated for the ads wherein ads with an aggregated impression score below a certain threshold such as, for example, 3%, 5%, 10% or the like are not entered as participants in the auction and/or do not have the lost auction counted against their throttled impressions lost due to budget restrictions.

One embodiment of an auction system that can be used with the present invention is described in U.S. patent application Ser. No. 10/112,654, entitled "Methods and Apparatus for Ordering Advertisements Based on Performance Information and Price Information", filed Mar. 29, 2002 and incorporated by reference in its entirety herein. The system can also be used in non-web environments such as video, television, audio, or video games. One embodiment of a video game system that can be used with the present invention is described in U.S. patent application Ser. No. 11/397,735, entitled "Method and apparatus for remote reporting of impression data using log files," filed Apr. 5, 2006 and incorporated by reference in its entirety herein.

Other reasons for excluding advertiser bids can be added to the system, such as low advertiser landing page quality, (i.e. the content linked from the advertisement is deemed to be unappealing to users due to low user response, not strongly relevant to the content category, and the like.) Impression share tracking can also be excluded for content pages, advertisements or advertising landing pages that are deemed by the advertising system to be spam using standard spam recognition techniques.

An advertiser can view impression share data via an advertising report summary such as a table or graph displayed via an account administration interface. A column of information is added to the report to represent impression share data on a per-advertisement, per-advertising campaign and/or per-advertising account level, as well as additional columns for more complex values based on impression share that will be described below.

Impression share can be considered at many different levels above individual advertisements, such as, for example, keyword, campaign, account etc. However, for such accumulated impression scores, simply calculating the impression share for a higher level (for example account) by adding the lower level impression shares (for example campaigns) is not always effective.

For example, a small advertiser has one account and two campaigns within it. Let say campaign c1 showed up for one query, campaign c2 showed up for another query and there is one more query for which both of the campaigns were eligible but none of them showed up. In this case c1's impression share is ½=50%, c2's impression share is also ½=50% but account's impression share is not 100% rather it is ⅔=66%. Thus, it is preferred to determine impression share for higher levels (campaign, account, customer, global for a content category, etc.) by tracking impressions according to unique IDs associated with campaigns, accounts, customers and other useful segmentation values rather than by simple addition of lower level statistics.

Impression share data is made available to the advertising server by keeping track of impression shares in advertising server logs.

For impression share of an advertising campaign, we define a potential impression to be missed impressions if the campaign was eligible for the auction but did not show up and if, in addition, no ads from the corresponding advertising account and/or advertising customer were shown.

There are two possible reasons why a campaign's ads are not shown. First, that the advertiser did not have a sufficient budget to present a winning bid, and, second, that the ad lost in the auction. The first type of missed impression is referred to as a throttled impression and second type of missed impression is referred to as a lost impression. In order to report impression share, it is not required to differentiate between these two types of impressions. However, breakdown of the reason for losing an auction can be helpful to the advertiser as it could give some idea on why they have a low impression score, whether it is because they are budget constrained or because they have low quality/low bid ads.

For account level impression share, in one embodiment, one can count an advertisement that failed to be presented to a user towards the account level missed impressions, if at least one advertisement in the account was eligible to be shown but none of the corresponding customer ads were in fact shown (for example, if all of the ads in the account lost their respective auctions.) The impression share is computed in the similar fashion as the one for the campaign. However, at the account level and higher, since an account can have multiple campaigns each with its own bid structure and budget, sub-values of missed impressions such as throttled impressions and lost might not be presented. Preferably, all campaigns in the account are included in the determination of impression shares for the account.

Some advertiser's may be interested in their global impression share, which for most will be their customer level impression share. However, for advertisers that have multiple customer accounts that they have linked together, the global impression share they might be interested in is the impression share at the customer level. This can be provided, for example, by creating an equivalent customer ID for the linked advertising accounts, and providing impression share data for that equivalent customer ID as if it were a customer account as described above.

Other valuable advertiser statistics, such as lost advertisement rank, lost total impression share, and lost advertisement budget can be calculated from these values, as discussed in more detail below. These advertiser statistics, which are not readily clear from raw data and which cannot be derived from general network-wide view data, provide valuable insight to an advertiser regarding their advertising campaign and the success or failure of their advertising strategy.

Providing Advertiser Statistics Based on Impression Share

An advertiser's impression share, in one embodiment, is the total percentage of advertising impressions that an advertiser receives in the particular niche, market, classification or category or audience the advertiser is targeting. By computing meaningful statistics on a per advertisement, per campaign, per advertiser or per customer basis, the resulting system gives advertisers information needed to set an optimal budgets and optimal bids for advertisement auctions.

Preferably, an advertiser can be defined as a single advertiser account associated with an advertisement. Alternatively, it can be defined as an advertiser account and associated sub-accounts or parent accounts of the advertiser based on affiliate programs, franchisee or licensee relationships. An advertising campaign can be a combination of one or more advertisements that fit into one or more content categories.

First, in a display decision step 300 it is determined by the advertising system whether a particular advertisement is going to be displayed. The display decision step 300 may be through an auction bid process. When the advertisement is going to be displayed, then in impression recording step 310 the number of impressions that the advertisement received is accrued (Shown Impressions) to an impressions accrued value 315. When the advertisement is not displayed, then a no impression recording step 320 calculates the number of potential impressions in which the advertisement failed to appear (Missed Impressions value 325). In a no impression reason step 330 the number of potential impressions lost due to budget issues is determined (Throttled Impressions value 333), and the number of potential impressions lost due to low bids and auction losses is also determined (Lost Impressions value 336). In some embodiments, an impression filter step 335 is performed which eliminates missed impressions in which the bid is below a threshold percentage of the winning bid, when spam is detected, when the auction is of low relevancy to the advertiser, and the like. This calculation procedure is repeated over a share window 340 after which impression share is calculated.

To calculate lost impressions quality threshold, only those lost impressions whose score is within a factor X of the score corresponding to the last winner is considered. For example, if X is "3," then only those lost impressions whose score is within a factor of "3" of the score corresponding to the last winner is considered.

For throttled impression, for each customer content ads maintain an aggregate score and only ads corresponding to aggregate score higher than an "x" amount are considered. Ads with value lower than this are not even entered into the auction. For example, the X can be 0.1, 0.2, 0.3, . . . 1, 2, 3, etc.

In some implementations, only ads with landing page quality of an X amount or higher are considered. For example, X can be 0.1, 0.2, . . . 1, 2, etc.

In an impression share calculation step 350, an impression share value 355 is determined where the impression share can then, in one embodiment, be determined as:

$$\text{Impression Share (IS)} = \text{ShownImpression}/(\text{ShownImpressions} + \text{ThrottledImpressions} + \text{LostImpressions}) \quad \text{(Eq. 1)}$$

The inverse of Impression Share, Impression Share Lost, can also be determined as:

$$\text{Impression Share Lost} = 1 - \text{Impression Share} \quad \text{(Eq. 2)}$$

These values can be further broken down into values for advertisers, such as, for example, Budget Lost and Rank Lost. In one embodiment, in a budget lost calculation step 360, Budget Lost (which expresses the impression share lost due to budget throttling) can me determined for a Budget Lost value 365 and is calculated as follows:

BudgetLost=ThrottledImpressions/(ShownImpressions+ThrottledImpressions+LostImpressions)   (Eq. 3)

Another valuable piece of data, Rank Lost, expresses the impression share lost due to low bids or auction losses. In one embodiment, in a rank lost calculation step 370, Rank Lost is calculated for a Rank Lost value 375 as follows:

RankLost=LostImpressions/(ShownImpressions+ThrottledImpressions+LostImpressions)   (Eq. 4)

The above metrics can be advantageously calculated for both search ads and content ads. For search ads, Impression Share data can be advantageously broken down further based upon the match type used to determine the relevance of the advertisement and advertisement keyword/category to the user query, by breaking down Impression Share by Match Type (such as Exact Match, Expanded Match, Broad Match) in a Match Type calculation step 380 for a Match Type Impression Share value 385.

This can be applied to Exact Match (e.g., where the advertising keyword exactly matches the search term), Expanded Match (e.g., where the advertising keyword matches variations on the search term), and Broad Match (e.g., where the advertising keyword matches the same content category as the search term). Other match types are also possible and can be used.

With exact matching, the query must be identical to keyword targeting criteria (i.e., one or more words or phrases used to make a targeting judgment (e.g., to determine whether an ad is relevant or not)). With phrase matching, the query must contain the targeting criteria words in the order specified by the phrase. With broad matching, the query must contain any one of one or more of the targeting criteria keywords, in any order. All three of these keyword matching methods use keyword targeting criteria. Keyword targeting criteria are normally provided by the advertiser as an explicitly entered list or lists. For example, an advertiser may enter a list of all words which might appear in a relevant search query. Although this approach permits the serving of highly relevant ads, and therefore ads which should perform well, it does have some limits. For example, advertisers might not be able to appreciate, or even foresee, search queries or search terms entered by a user who would be receptive to their ads. Therefore, it would be useful to provide more sophisticated ways of identifying ads that are relevant to a search query, even if the search query doesn't contain the exact words targeted by the advertiser. Therefore it might often be useful to relax the notion of relevant ads.

For example, for an advertising keyword "plasma hdtv", a user search query of "plasma hdtv" would be considered an Exact Match. A user query of "cheap plasma hdtv" or "plasma tv" may be considered an Exanded Match. A user query of "LCD hdtv" or "high definition flat screen TV" may be considered a Broad Match.

Impression Share based on MatchType helps the advertisers to enhance its ads to reach a very high percentage of its core audiences through bidding high for exact match keywords, while providing a good understanding of the broader market by understanding broad match impression share.

While the system has been described with respect to advertisement auctions, it can also be applied to other advertising server systems where non-auction mechanisms such as relevancy selection, random selection, or other algorithms are employed to select ads for inclusion with content.

Many modifications of the system are possible. For example, in determining whether an advertising impression should be described as a "lost impression," an advertising system can take into account ambiguous situations such as (a) whether the advertisement was placed on a different content page than the one sought by the advertiser in the auction, (b) whether the advertiser sought a particular bid position but lost the auction for that particular bid position, and (c) whether the content page for which the auction takes place, the advertisement, or the advertisement landing page is considered to be spam. In one embodiment, placement on a different content page is not considered a lost impression, while losing a bid to position auction is considered a lost impression. Other ambiguous situations and results can also be considered.

Figure 4:
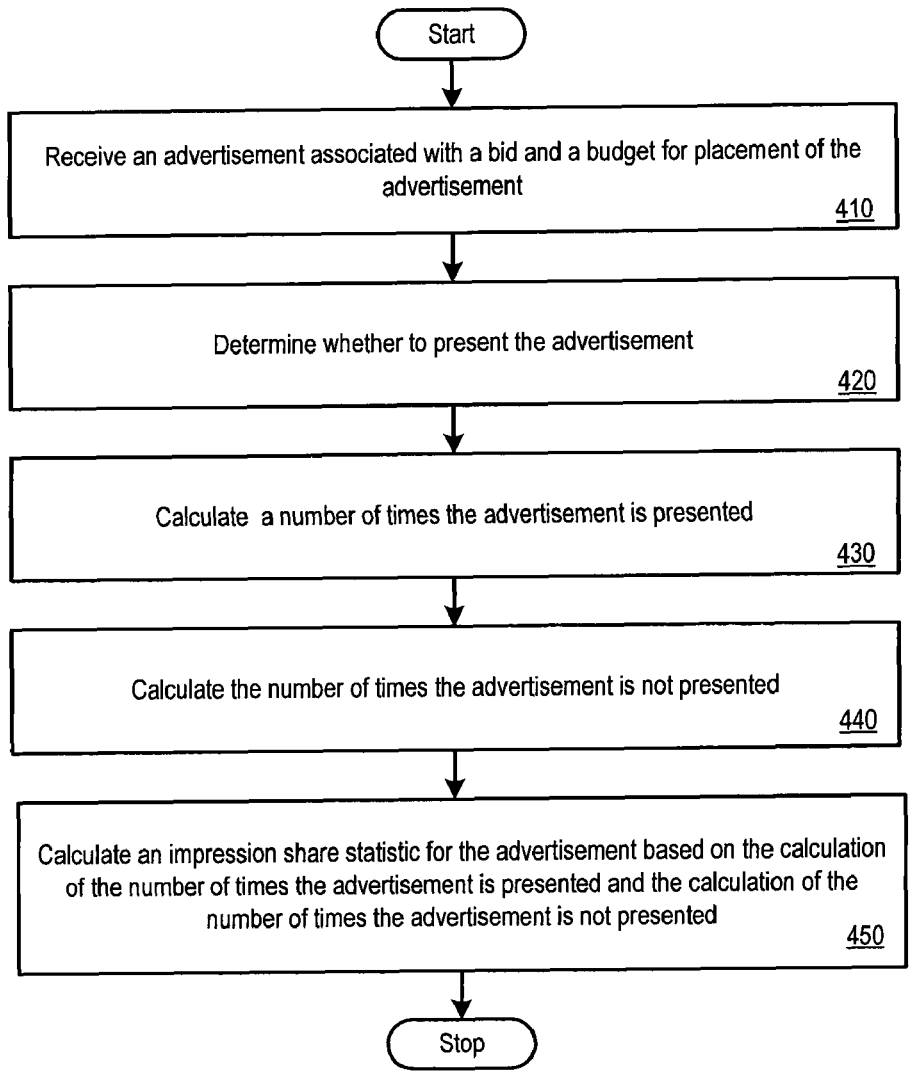
FIG. 4 is a flow diagram of an implementation of a process for providing advertisement impression share.

FIG. 4 is a flow diagram of an implementation of a process for providing advertisement impression share.

Step 410 receives an advertisement associated with a bid and a budget for placement of the advertisement. For example, the ad mixer 210 can receive an advertisement associated with a bid and a budget for placement of the advertisement.

Step 420 determines whether to present the advertisement. For example, the ad mixer 210 can determine whether to present the advertisement.

Step 430 calculates a number of times the advertisement is presented. For example, the ad mixer 210 can calculate a number of times the advertisement is presented.

Step 440 calculates the number of times the advertisement is not presented. For example, the ad mixer 210 can calculate the number of times the advertisement is not presented.

Step 450 calculates an impression share statistic for the advertisement based on the calculation of the number of times the advertisement is presented and the calculation of the number of times the advertisement is not presented. For example, the ad mixer 210 can calculate an impression share statistic for the advertisement.

Unlike systems that provide traffic estimations for an entire network, which can be less accurate for advertisers targeting a particular audience, the present system provides targeted information related to the advertisements, market and categories in which an advertiser is seeking advertising impressions. Impression share thus gives advertisers insight into their advertising success on a URL and domain level performance without the burden of the advertiser or the advertising network having to manually sift and interpret large quantities of raw data.

Advertising Management System Architecture

Figure 3:
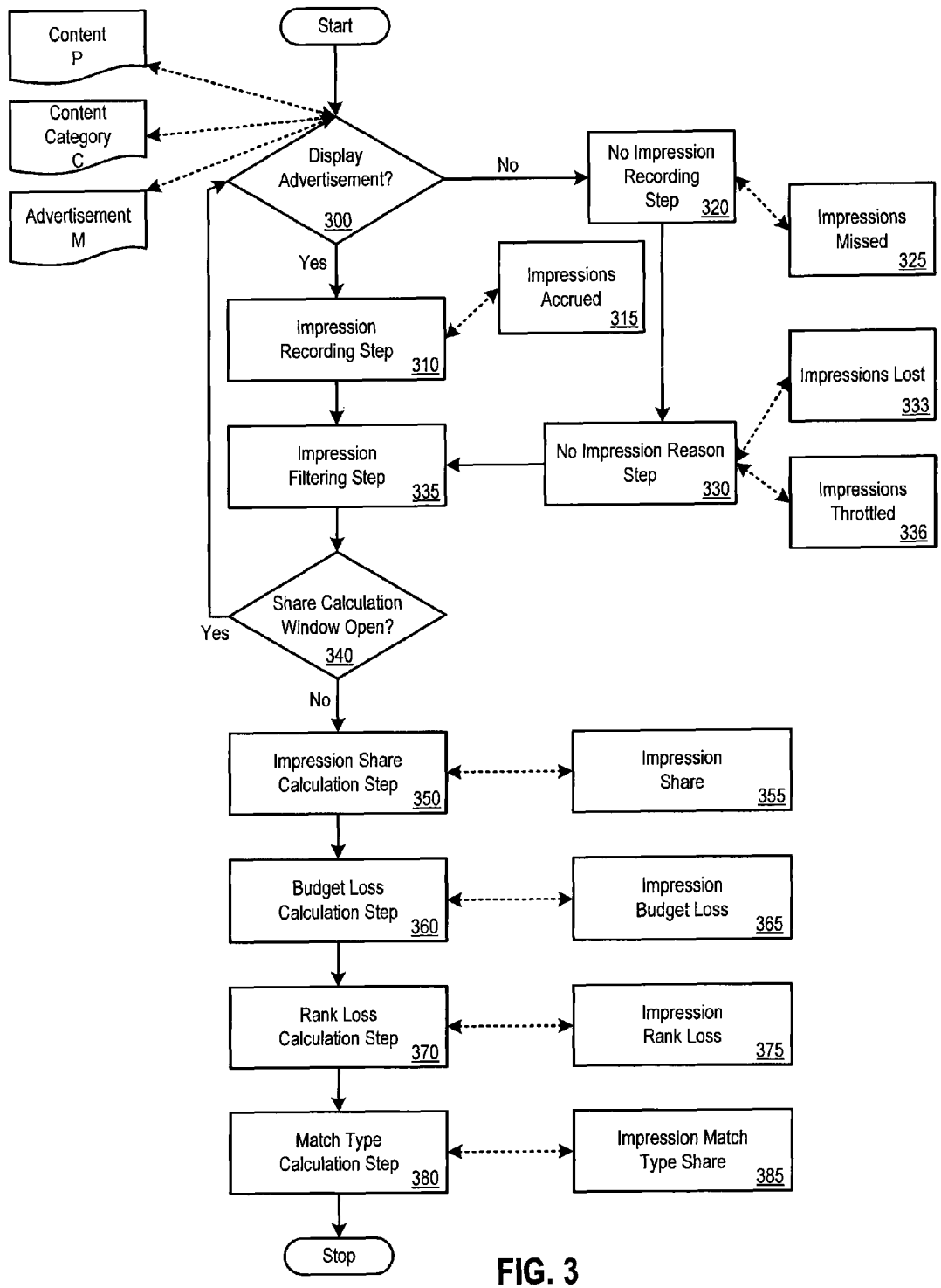
FIG. 3 is a flow diagram of an implementation of a process for determining market share.
Figure 5:
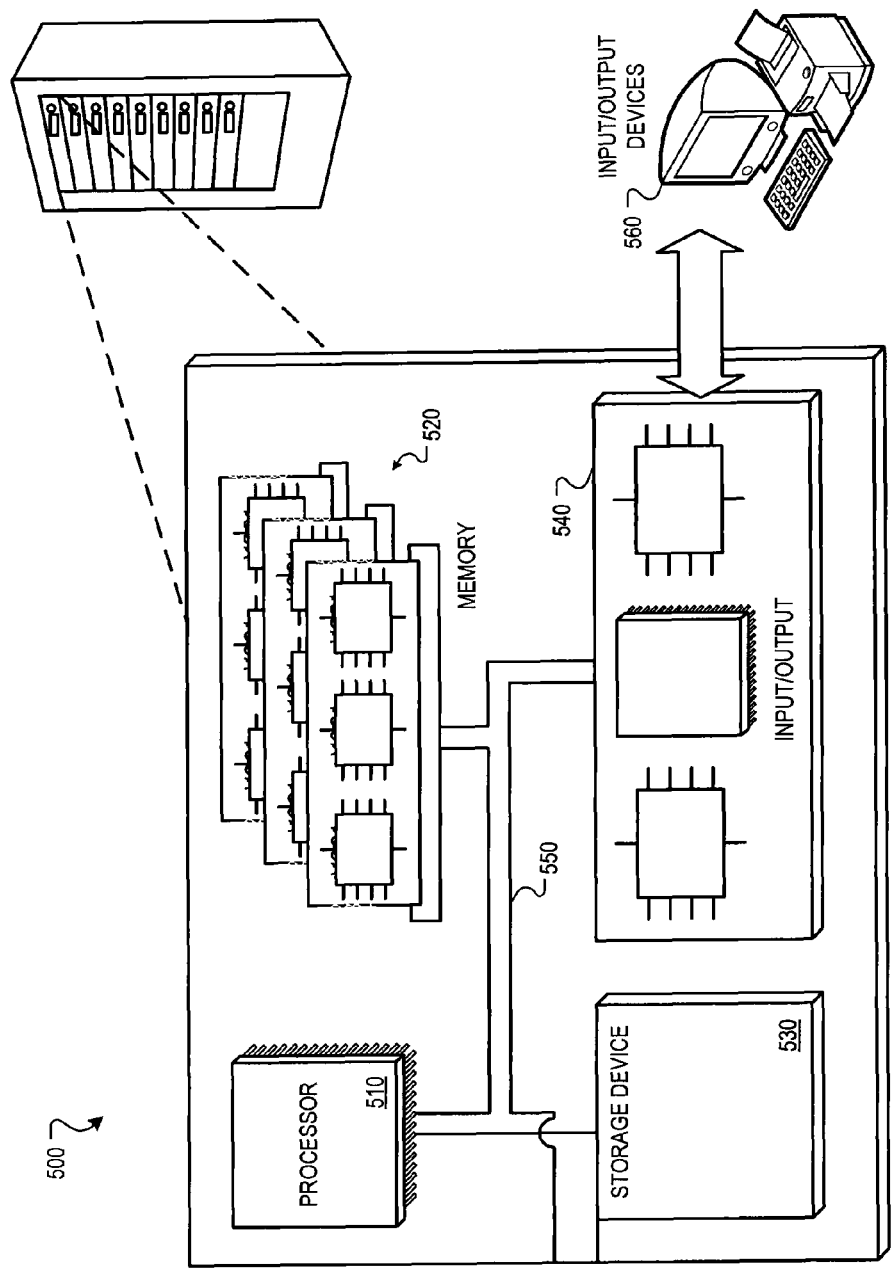
FIG. 5 is a block diagram of an implementation of system for implementing the processes of FIGS. 3-4.

FIG. 5 is a block diagram of a system 500 for performing the various operations described in reference to FIGS. 1-3. For example, the system 500 may be included in the advertising management system 104, described in reference to FIG. 1. The system 500 includes a processor 510, a memory 520, a storage device 530, and an input/output device 540. Each of the components 510, 520, 530, and 540 are interconnected using a system bus 1500. The processor 510 is capable of processing instructions for execution within the system 500. In some implementations, the processor 510 is a single-threaded processor. In another implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In another implementations, the memory 520 is a volatile memory unit. In yet another implementations, the memory 520 is a non-volatile memory unit.

The storage device 530 is capable of providing mass storage for the system 500. In some implementations, the storage device 530 is a computer-readable medium. In various different implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In another implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as those described above with respect to FIGS. 1 and 2. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method of providing advertisement impression share, comprising:
  receiving an advertisement associated with a bid and a budget for placement of the advertisement;
  determining whether to present the advertisement;
  calculating, by a computer, a number of times the advertisement is presented;
  calculating, by the computer, the number of times the advertisement is not presented; and
  calculating, by the computer, an impression share statistic for the advertisement based on the calculation of the number of times the advertisement is presented and the calculation of the number of times the advertisement is not presented.

2. The method of claim 1, wherein determining whether to present the advertisement comprises:
  determining whether the budget associated with the advertisement has been exceeded; and
  presenting the advertisement if the budget has not been exceeded.

3. The method of claim 1, wherein determining whether to present the advertisement comprises:
  determining whether the bid associated with the advertisement is higher than bids associated with other advertisements; and
  presenting the advertisement if the bid is higher than the bids associated with the other advertisements.

4. The method of claim 1, wherein calculating the number of times the advertisement is not presented comprises:
  calculating the number of times the budget associated with the advertisement has been exceeded; and
  calculating the number of times the bid associated with the advertisement was lower than bids associated with other advertisements.

5. The method of claim 1, wherein calculating the number of times the advertisement is not presented comprises:
    calculating the number of times the bid associated with the advertisement is higher than a percentage minimum threshold relative to bids associated with advertisements presented.

6. The method of claim 1, wherein calculating the number of times the advertisement is not presented comprises:
    calculating the number of times the budget associated with the advertisement is higher than a percentage minimum threshold relative to budgets associated with advertisements presented.

7. The method of claim 1, wherein the bid is a maximum amount an advertiser associated with the advertisement will pay for a click on the advertisement.

8. The method of claim 1, wherein calculating an impression share statistic for the advertisement comprises:
    calculating the impression share statistic for a campaign associated with the advertisement.

9. The method of claim 1, wherein calculating an impression share statistic for the advertisement comprises:
    calculating the impression share statistic for an advertising account associated with the advertisement.

10. The method of claim 1, wherein calculating an impression share statistic for the advertisement comprises:
    calculating the impression share statistic for an advertiser associated with the advertisement.

11. The method of claim 1, further comprising:
    updating the impression share statistic daily.

12. The method of claim 1, wherein the impression share statistic is at least one of a potential impressions in which the advertisement failed to appear, potential, impressions lost due to budget, and potential impressions lost due to bid amount.

13. The method of claim 4, wherein calculating an impression share statistic for the advertisement comprises:
    calculating a sum of the number of times the budget associated with the advertisement has been exceeded, the number of times the bid associated with the advertisement was lower than bids associated with other advertisements, and the number of times the advertisement was presented; and
    dividing the number of times the advertisement was presented by the sum.

14. The method of claim 4, wherein calculating an impression share statistic for the advertisement comprises:
    calculating a sum of the number of times the budget associated with the advertisement has been exceeded, the number of times the bid associated with the advertisement was lower than bids associated with other advertisements, and the number of times the advertisement was presented;
    dividing the number of times the budget associated with the advertisement has been exceeded by the sum.

15. The method of claim 4, wherein calculating an impression share statistic for the advertisement comprises:
    calculating a sum of the number of times the budget associated with the advertisement has been exceeded, the number of times the bid associated with the advertisement was lower than bids associated with other advertisements, and the number of times the advertisement was presented;
    dividing the number of times the bid associated with the advertisement was lower than bids associated with other advertisements by the sum.

16. A computer program product tangibly embodied in a machine-readable medium, the computer program product comprising instructions that, when read by a machine, operate to cause a data processing apparatus to:
    receiving an advertisement associated with a bid and a budget for placement of the advertisement;
    determining whether to present the advertisement;
    calculating a number of times the advertisement is presented;
    calculating the number of times the advertisement is not presented; and
    calculating an impression share statistic for the advertisement based on the calculation of the number of times the advertisement is presented and the calculation of the number of times the advertisement is not presented.

17. The computer program product of claim 16, wherein determining whether to present the advertisement comprises:
    determining whether the budget associated with the advertisement has been exceeded; and
    presenting the advertisement if the budget has not been exceeded.

18. The computer program produce of claim 16, wherein determining whether to present the advertisement comprises:
    determining whether the bid associated with the advertisement is higher than bids associated with other advertisements; and
    presenting the advertisement if the bid is higher than the bids associated with the other advertisements.

19. The computer program product of claim 16, wherein calculating the number of times the advertisement is not presented comprises:
    calculating the number of times the budget associated with the advertisement has been exceeded; and
    calculating, the number of times the bid associated with the advertisement was lower than bids associated with other advertisements.

20. The computer program product of claim 16, wherein calculating the number of times the advertisement is not presented comprises:
    calculating the number of times the bid associated with the advertisement is higher than a percentage minimum threshold relative to bids associated with advertisements presented.

21. The computer program product of claim 16, wherein calculating the number of times the advertisement is not presented comprises:
    calculating the number of times the budget associated with the advertisement is higher than a percentage minimum threshold relative to budgets associated with advertisements presented.

22. The computer program product of claim 16, wherein the bid is a maximum amount an advertiser associated with the advertisement will pay for a click on the advertisement.

23. The computer program product of claim 16, wherein calculating an impression share statistic for the advertisement comprises:
    calculating the impression share statistic for a campaign associated with the advertisement.

24. A system comprising:
    a user interface device; and
    one or more computers operable to interact with the user interface device to:
    receiving an advertisement associated with a bid and a budget for placement of the advertisement;
    determining whether to present the advertisement;
    calculating a number of times the advertisement is presented;
    calculating the number of times the advertisement is not presented; and calculating an impression share statistic for the advertisement based on the calculation of the number of times the advertisement is presented and the calculation of the number of times the advertisement is not presented.

25. A system, comprising:

means for receiving an advertisement associated with a bid and a budget for placement of the advertisement;

means for determining whether to present the advertisement;

means for calculating a number of times the advertisement is presented;

means for calculating the number of times the advertisement is not presented; and means for calculating an impression share statistic for the advertisement based on the calculation of the number of times the advertisement is presented and the calculation of the number of times the advertisement is not presented.

* * * * *